US012233835B2

(12) United States Patent
Freund

(10) Patent No.: US 12,233,835 B2
(45) Date of Patent: Feb. 25, 2025

(54) METHOD FOR OPERATING A BRAKE SYSTEM FOR A MOTOR VEHICLE, CONTROL UNIT AND BRAKE SYSTEM

(71) Applicant: ZF Active Safety GmbH, Koblenz (DE)

(72) Inventor: Christian Freund, Melsbach (DE)

(73) Assignee: ZF Active Safety GmbH, Koblenz (DE)

( * ) Notice: Subject to any disclaimer, the term of this patent is extended or adjusted under 35 U.S.C. 154(b) by 248 days.

(21) Appl. No.: 18/082,792

(22) Filed: Dec. 16, 2022

(65) Prior Publication Data

US 2023/0202438 A1 Jun. 29, 2023

(30) Foreign Application Priority Data

Dec. 23, 2021 (DE) .......................... 102021134437.9

(51) Int. Cl.
*B60T 8/17* (2006.01)
*B60T 8/1755* (2006.01)

(52) U.S. Cl.
CPC ......... *B60T 8/1755* (2013.01); *B60T 2240/00* (2013.01); *B60T 2270/602* (2013.01)

(58) Field of Classification Search
CPC .... B60T 8/1755; B60T 8/17616; B60T 8/885; B60T 8/88; B60T 2240/00; B60T 2270/602; B60T 10/08; B60T 10/188; B60W 30/02; B60W 30/18172; B60W 50/02
USPC ...................... 701/70, 71, 76, 78, 81, 82, 83
See application file for complete search history.

(56) References Cited

U.S. PATENT DOCUMENTS

| 5,413,404 | A  | * | 5/1995 | Inagawa | B60T 13/148 340/451 |
| 5,733,017 | A  | * | 3/1998 | Nakashima | B60T 8/4036 303/10 |
| 5,743,598 | A  | * | 4/1998 | Toda | B60T 8/4291 303/122.12 |
| 5,884,986 | A  | * | 3/1999 | Shimizu | B60T 8/4275 303/122.1 |
| 6,226,586 | B1 | * | 5/2001 | Luckevich | B60T 13/686 303/155 |
| 7,530,648 | B2 | * | 5/2009 | Obai | B60T 8/4275 303/162 |

(Continued)

FOREIGN PATENT DOCUMENTS

| AT | 12010 U2 | 9/2011 | |
| DE | 102018133189 A1 | 6/2020 | |
| JP | 3-42361 * | 2/1991 | ................ B60T 8/58 |

(Continued)

*Primary Examiner* — Hai H Huynh
(74) *Attorney, Agent, or Firm* — Kristin L. Murphy

(57) ABSTRACT

A method is provided for operating a brake system for a motor vehicle having at least one electric drive and having four wheels. The brake system has a brake device with a hydraulic pressure-generating unit and with a control unit, has a slip control system, and has four brake actuators which are connected in 1-channel configuration to the pressure-generating unit and which are assigned to a respective one of the wheels. In the event of a failure of the slip control system, in order to substitute the failed slip control system, applying a pressure to the four brake actuators by the pressure-generating unit, and driving the rear wheels by the electric drive.

14 Claims, 3 Drawing Sheets

(56) References Cited

U.S. PATENT DOCUMENTS 10,384,661 B2 * 8/2019 Ishida .................... B60T 8/175

FOREIGN PATENT DOCUMENTS

| JP | 4-143155 | * | 5/1992 | ................ B60T 8/36 |
| JP | 3726505 | * | 12/2005 | ................ B60T 8/88 |
| JP | 3787882 | * | 6/2006 | ................ B60T 8/94 |
| WO | 2011015422 A1 | | 2/2011 | |

* cited by examiner

METHOD FOR OPERATING A BRAKE SYSTEM FOR A MOTOR VEHICLE, CONTROL UNIT AND BRAKE SYSTEM

CROSS-REFERENCE TO RELATED APPLICATION

This application claims priority to German Priority Application No. 102021134437.9, filed Dec. 23, 2021, the disclosure of which is incorporated herein by reference in its entirety.

TECHNICAL FIELD

The disclosure relates to a method for operating a brake system for a motor vehicle having at least one electric drive, having a left-hand front wheel, having a right-hand front wheel, having a left-hand rear wheel and having a right-hand rear wheel. The disclosure is furthermore directed to a control unit for a brake system, which control unit is configured to carry out such a method. The disclosure furthermore relates to a brake system having a control unit of said type.

BACKGROUND

Brake systems have a brake device with a hydraulic pressure-generating unit and with a control unit, a slip control system, and four brake actuators which are connected in 1-channel configuration to a pressure-generating unit and which are assigned to a respective one of the wheels of the motor vehicle.

Such methods and control units for carrying out said methods, and brake systems equipped with such control units, are known from the prior art.

Electrically driven motor vehicles are of ever-increasing importance in the automotive industry and are also an increasingly common sight on the road. A further trend is that of motor vehicles with autonomous driving modes, which in the future will allow the task of vehicle guidance to be at least temporarily handed over to the motor vehicle.

In order to increase or ensure driving stability, modern motor vehicles have a slip control system that prevents the wheels from spinning or locking in drive and/or braking situations of the motor vehicle. For this purpose, the slip of the wheels is monitored by wheel sensors during travel.

Here, particular attention must be paid to fail safety, because a failed slip control system can no longer contribute to ensuring driving stability and safe deceleration of the motor vehicle.

SUMMARY

What is needed is a method for operating a brake system for a motor vehicle, which method ensures driving stability, and safe deceleration of the motor vehicle, in the event of a failure of a slip control system. It is furthermore needed to provide control units and brake systems associated with the method.

A method is disclosed for operating a brake system for a motor vehicle having at least one electric drive, having a left-hand front wheel, having a right-hand front wheel, having a left-hand rear wheel and having a right-hand rear wheel. Here, the brake system has a brake device with a hydraulic pressure-generating unit and with a control unit, has a slip control system, and has four brake actuators which are connected in 1-channel configuration to the pressure-generating unit and which are assigned to a respective one of the wheels of the motor vehicle. In the event of a failure of the slip control system, in order to substitute the failed slip control system, the method in this case has the following steps:

a) applying a pressure to the four brake actuators by the pressure-generating unit, and
b) driving the rear wheels by the electric drive.

Here, "in 1-channel configuration" means that the brake pressure of the four brake actuators is controlled jointly by way of the pressure-generating unit, that is to say one controllable pressure source. In other words, the brake device with the four brake actuators forms a 1-channel system.

In the context of the disclosure, in an event of a failure of the slip control system, the wheel sensors that ascertain the slip of the wheels are not affected.

Below, the term "front wheels" encompasses the left-hand front wheel and the right-hand front wheel, whereas the term "rear wheels" correspondingly encompasses the left-hand rear wheel and the right-hand rear wheel. Furthermore, the term "wheels" refers to the left-hand front wheel, the right-hand front wheel, the left-hand rear wheel and the right-hand rear wheel, unless stated otherwise.

By virtue of a pressure being actively applied to the four brake actuators jointly and the rear wheels being driven, the driving stability of the motor vehicle can be ensured even in the case of a failed slip control system. In this way, safe deceleration of the motor vehicle can be ensured even on an underlying surface with low or varying friction coefficients.

For this purpose, in one exemplary arrangement, in step a), the pressure is controlled on the basis of the slip of at least one of the front wheels. The slip of the at least one front wheel is ascertained here by a wheel sensor that is assigned to the corresponding front wheel. In this way, it can be ensured that the two front wheels do not lock simultaneously and thus jeopardize driving stability.

Here, provision may be made whereby, in step a), the pressure at least temporarily has a value that leads to locking of a single one of the wheels, for example of a single one of the front wheels. In the context of the disclosure, "temporarily" is to be understood to mean a duration of at least 0.1 seconds, and in one exemplary arrangement, at least 0.5 seconds. In this way, locking of one of the wheels is permitted as long as the trajectory of the motor vehicle allows this. In other words, a locked wheel is tolerated if it does not jeopardize the safety of the motor vehicle and/or of the road traffic. This has the advantage that the boundary conditions for the control of the brake system are considerably broader than under the common stipulation in the prior art that locking of the wheels, in particular temporary locking, must be avoided. The motor vehicle can thus be braked and/or stabilized more effectively.

In a further exemplary arrangement, in step b), the rear wheels are driven in a manner controlled on the basis of the slip of at least one of the rear wheels. The slip of the at least one rear wheel is ascertained here by a wheel sensor that is assigned to the corresponding rear wheel. In this way, the drive of the rear wheels can be controlled such that these exhibit a certain degree of slip, for example, a particularly low degree of slip. Here, the particularly high dynamics of the electric drive provide effective wheel slip control, by which it is even possible to react quickly to changing friction coefficients of the roadway or of the underlying surface.

Here, in one exemplary arrangement, in step b), the rear wheels are driven such that at least one of the rear wheels runs with a degree of slip of less than 10%. In another exemplary arrangement, the degree of slip is less than 3%. These arrangements ensure reliable lateral control of the rear wheels even in the event of critical or particularly intense decelerations. Here, the torque distribution of the differential of the rear axle ensures that that rear wheel which is running on the highest friction coefficient always begins to rotate, or rotates concomitantly, and can thus reliably ensure the important lateral guidance of the rear axle.

In one exemplary arrangement, the method is provided in a motor vehicle with an autonomous driving mode in order to increase the safety of the motor vehicle, for example when the motor vehicle is being operated in the autonomous driving mode and a driver cannot intervene in the guidance of the motor vehicle, or no provision is made for this.

In a further exemplary arrangement, the brake system comprises an electronic brake booster and/or is a brake-by-wire brake system.

According to the disclosure, a control unit for a brake system is also provided, which control unit is configured to carry out the method according the disclosure with the above-stated advantages.

Here, in one exemplary arrangement, the control unit is connected, for transmission of signals, to four wheel sensors that are assigned to a respective one of the wheels of the motor vehicle. It is ensured in this way that the control unit can reliably ascertain the slip of the wheels even if the slip control system has failed.

According to the disclosure, a brake system having a control unit according to the disclosure with the above-stated advantages is also provided.

BRIEF DESCRIPTION OF DRAWINGS

Further features and advantages will emerge from the following description and from the appended drawings. In the drawings.

DETAILED DESCRIPTION

Figure 1:
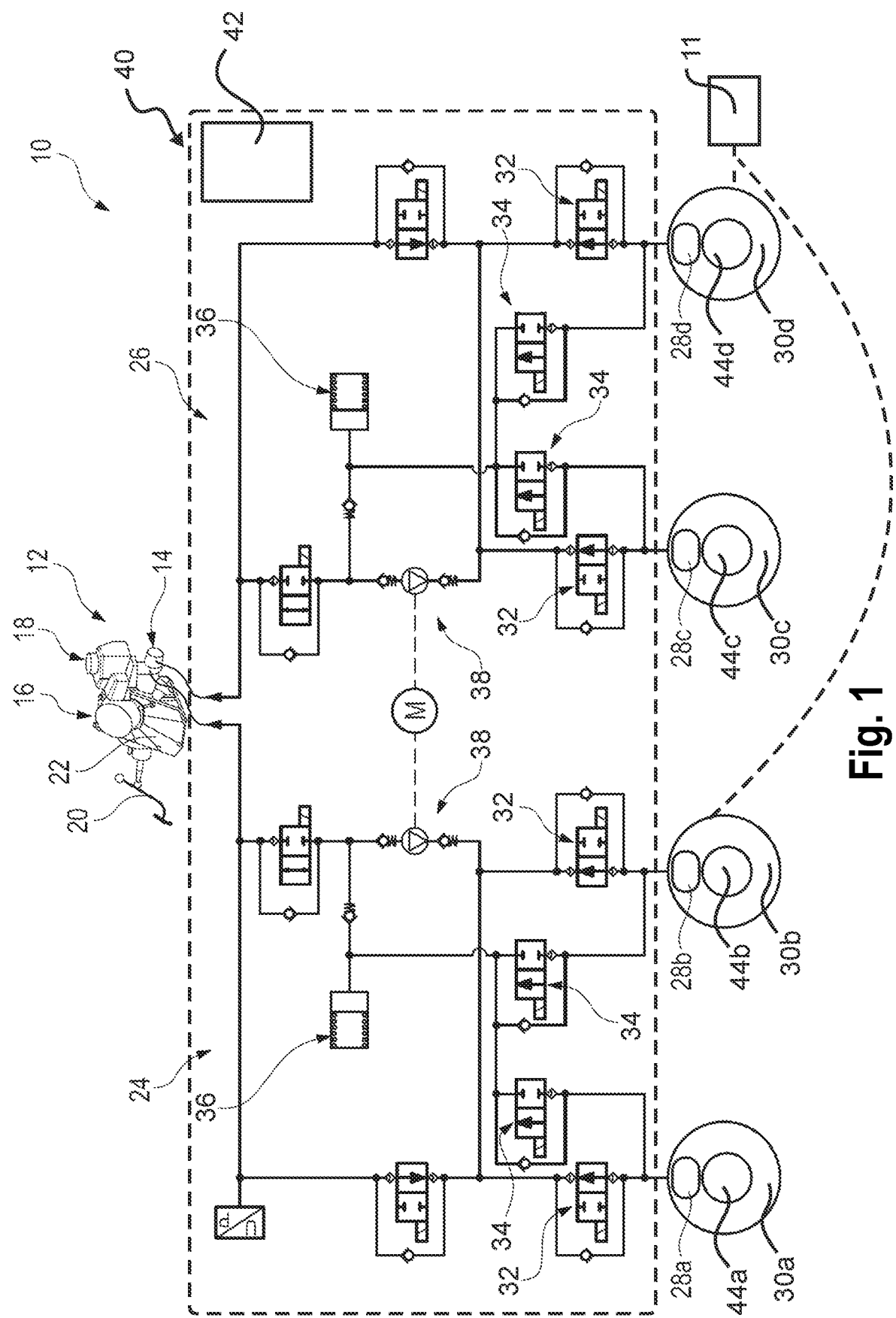
FIG. 1 shows the brake system according to the disclosure with a control unit according to disclosure, which is configured to carry out a method according to the disclosure.

FIG. 1 shows a hydraulic brake system 10 for a motor vehicle with an electric drive.

The electric drive 11 is an electric motor.

The motor vehicle may be an electric vehicle or a hybrid vehicle with partially electric drive.

The motor vehicle may furthermore be configured to drive autonomously. This means that the motor vehicle has a driving mode in which it is driven and controlled or steered autonomously.

The brake system 10 has a brake master cylinder unit 12, which has a hydraulic pressure-generating unit 14 and a brake device 16.

The brake device 16 is for example an electrical brake booster.

Additionally or alternatively, the brake system 10 may be configured as a brake-by-wire brake system.

The brake master cylinder unit 12 furthermore has a fluid reservoir 18 by means of which a brake fluid, which in the present case is a hydraulic fluid, is supplied to the brake system 10.

A brake pedal 20 is furthermore coupled to the brake device 16, which brake pedal can be actuated by a driver of the motor vehicle as required.

Furthermore, a control unit 22 for controlling the hydraulic brake system 10 is integrated into the brake master cylinder unit 12.

A first brake circuit 24 and a second brake circuit 26 are connected to the pressure-generating unit 14.

Here, a first wheel-side brake actuator 28a, which is for example assigned to a right-hand front wheel 30a of the motor vehicle, can be actuated by the first brake circuit 24.

Furthermore, a second wheel-side brake actuator 28b, which is for example assigned to a left-hand rear wheel 30b of the motor vehicle, can be actuated by the first brake circuit 24.

A third wheel-side brake actuator 28c, which is for example assigned to a left-hand front wheel 30c of the motor vehicle, can be actuated by the second brake circuit 26.

Furthermore, a fourth wheel-side brake actuator 28d, which is for example assigned to a right-hand rear wheel 30d of the motor vehicle, can be actuated by the second brake circuit 26.

Thus, in the present example exemplary arrangement, the brake circuits 24, 26 are in a diagonal circuit configuration.

The front wheels 30a, 30c are connected by way of a front axle of the motor vehicle and are mounted so as to be pivotable for the purposes of steering the motor vehicle.

The rear wheels 30b, 30d are connected by a rear axle of the motor vehicle and can be driven jointly by the electric drive 11.

In an alternative exemplary arrangement, each of the rear wheels 30b, 30d may be driven individually by a separate electric drive 11.

In a manner known per se, each of the brake actuators 28a to 28d is assigned a pressure supply valve 32, which in the present case is configured as a so-called ABS inflow valve.

The pressure supply valves 32 are each preloaded into an open position and, in this position, hydraulically connect the associated brake actuator 28a to 28d to the pressure-generating unit 14.

Such pressure supply valves 32 are known per se, such that no further explanation will be given in this regard.

Furthermore, each brake actuator 28a to 28d is assigned a pressure relief valve 34, which is configured as a so-called ABS outflow valve.

The pressure relief valves 34 are each preloaded into a closed position.

By actuation of the pressure relief valves 34, the respectively assigned brake actuators 28a to 28d can be hydraulically connected to a respectively associated fluid accumulator 36.

In the present case, each of the brake circuits 24, 26 comprises a fluid accumulator 36.

The fluid accumulators 36 are configured as spring-loaded low-pressure accumulators.

Each of the brake circuits 24, 26 is furthermore configured with a motor-driven pump 38.

The brake circuits 24, 26 are in this case part of a slip control system 40 with a control unit 42.

The slip control system 40 is for example part of a driving dynamics control system of the motor vehicle.

The control unit 42 is connected, for transmission of signals, to a first wheel sensor 44a, a second wheel sensor 44b, a third wheel sensor 44c and a fourth wheel sensor 44d.

The first wheel sensor 44a is assigned to the right-hand front wheel 30a of the motor vehicle, the second wheel sensor 44b is assigned to the left-hand rear wheel 30b, the third wheel sensor 44c is assigned to the left-hand front wheel 30c, and the fourth wheel sensor 44d is assigned to the right-hand rear wheel 30d.

In this context, the control unit 42 is configured to use the wheel sensors 44a to 44d to respectively ascertain the slip of the corresponding wheels 30a to 30d.

The control unit 22 is also connected, for transmission of signals, to the wheel sensors 44a to 44d and configured, independently of the control unit 42, to use the wheel sensors 44a to 44d to respectively ascertain the slip of the corresponding wheels 30a to 30d.

The slip control system 40 may however in principle be of any desired configuration.

In all exemplary arrangements, the brake actuators 28a to 28d are coupled in 1-channel configuration to the pressure-generating unit 14, for example via the brake circuits 24, 26 as in the present exemplary arrangement.

With this configuration of the brake system 10, in the event of a failure of the slip control system 40, the pressure supply valves 32 are opened, and a pressure can be applied to the brake actuators 28a to 28d jointly by the pressure-generating unit 14.

As already discussed, the control unit 22 is configured to carry out a method for operating the brake system 10.

Here, the method has the following steps in order, in the event of a failure of the slip control system 40, to substitute or compensate the function of the slip control system.

In a first step, a pressure is actively applied to the four brake actuators 28a to 28d by the pressure-generating unit 14.

Here, the pressure is controlled on the basis of the slip that is ascertained by at least one of the wheel sensors 44a to 44d at one of the wheels 30a to 30d.

In one exemplary arrangement, the pressure is controlled on the basis of the slip of at least one of the front wheels 30a, 30c.

Here, pressures that at least temporarily lead to locking of one of the wheels 30a to 30d, such as one of the front wheels 30a, 30c, are permitted.

Pressures that lead to more than one of the wheels 30a to 30d temporarily locking simultaneously are avoided.

In a second step, which may take place in parallel with the first step, the rear wheels 30b, 30d are driven by the electric drive 11 in order to prevent locking of the rear wheels 30b, 30d that would take place without activation of the electric drive 11.

Here, the rear wheels 30b, 30d are driven in a manner controlled on the basis of the slip that is ascertained by at least one of the wheel sensors 44b, 44d at one of the rear wheels 30b, 30d.

Here, the rear wheels 30b, 30d are driven such that at least one of the rear wheels 30b, 30d runs with a degree of slip of less than 10%. In one exemplary arrangement, the degree of slip is less than 3%.

Furthermore, the method may be carried out in accordance with a so-called "select-low" control strategy. Here, it is permitted that one of the front wheels 30a, 30c locks owing to the pressure. However, as soon as one of the wheels 30a to 30d moves into a state of low slip, the pressure is reduced to such an extent that the rear wheels 30b, 30d begin to roll again.

An exemplary arrangement of the method will be described in detail below on the basis of FIGS. 2 to 4.

Figure 2:
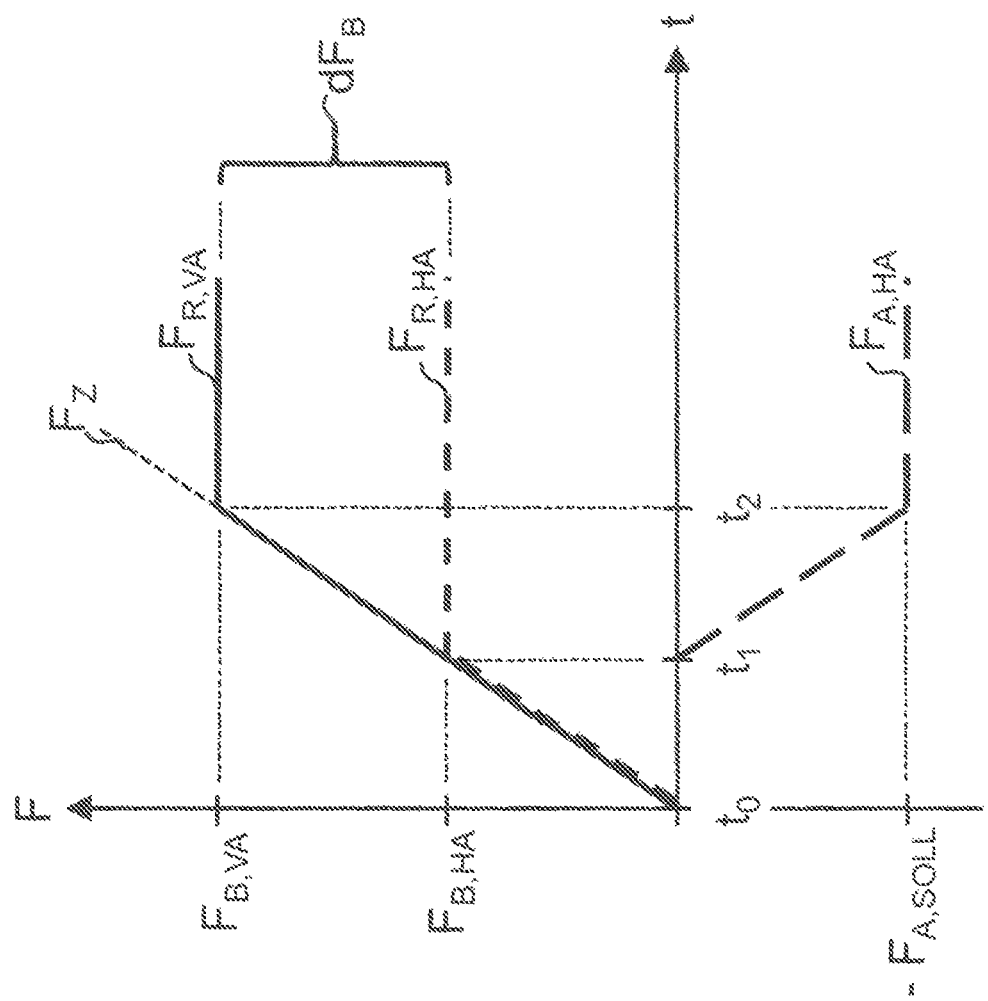
FIG. 2 shows a force-time diagram with the states $t_1$ and $t_2$, which describes the course of a method according to the disclosure, FIG. 3 schematically shows a motor vehicle in the state $t_1$, and FIG. 4 schematically shows a motor vehicle in the state $t_2$.

Here, FIG. 2 shows an idealized force-time diagram illustrating the profiles with respect to time of a resulting braking force $F_{R,VA}$ at the wheels 30a, 30c of the front axle (solid line), of a resulting braking force $F_{R,HA}$ at the wheels 30b, 30d of the rear axle (line with short dashes) and of a drive force $F_{A,HA}$ that is to be set at the wheels 30b, 30d of the rear axle (line with long dashes).

At the time $t_0$, the braking operation is initiated by virtue of a central, 1-channel brake pressure being built up by the pressure-generating unit 14. In this way, the brake actuators 28a to 28d are charged uniformly such that initially a rising central braking force $F_Z$ acts at each of the wheels 30a to 30d of the front and rear axles, as shown by the braking force profiles $F_{R,VA}$ and $F_{R,HA}$.

Owing to the dynamic wheel load distribution that arises during the braking operation, at the time $t_1$ the central braking force $F_Z$ reaches a rear locking braking force $F_{B,HA}$ of at least one wheel 30b, 30d of the rear axle, beyond which at least one of the wheels 30b, 30d of the rear axle locks. As a result of the locking of one of the rear wheels 30b, 30d, the motor vehicle could lose its stability, for example as a result of oversteer.

In order to counteract this, starting at the time $t_1$, the resulting drive force $F_{A,HA}$ at the wheels 30b, 30d of the rear axle is set, in terms of its profile, so as to counteract the rising central braking force $F_Z$ in order to set a substantially constant rear braking force profile $F_{R,HA}$ that lies in a range of the rear locking braking force $F_{B,HA}$.

Owing to the rising central braking force $F_Z$, the front braking force profile $F_{R,VA}$ also continues to rise until the time $t_2$.

Consequently, between the times $t_1$ and $t_2$, the gradient of the drive force profile $F_{A,HA}$ substantially corresponds in terms of magnitude to the gradient of the front braking force profile $F_{R,VA}$, or to the gradient of the profile of the central braking force $F_Z$.

At the time $t_2$, the central braking force $F_Z$ reaches a front locking braking force $F_{B,VA}$ of at least one wheel 30a, 30c of the front axle, beyond which at least one of the wheels 30a, 30c of the front axle locks. As a result of the locking of one of the front wheels 30a, 30c, the motor vehicle could lose its stability, for example as a result of understeer.

In order to prevent this, starting at the time $t_2$, the central braking force $F_Z$ is set such that, at the wheels 30a, 30c of the front axle, a substantially constant front braking force profile $F_{R,VA}$ is obtained which lies in a range of the front locking braking force $F_{B,VA}$.

Starting at the time $t_2$, it is furthermore the case that the resulting drive force $F_{A,HA}$ at the wheels 30b, 30d of the rear axle is set, in terms of its profile, so as to result in a substantially constant rear drive force profile $F_{A,HA}$ that lies in a range of a rear setpoint drive force $F_{A,SOLL}$ that is to be set.

The front locking braking force $F_{B,VA}$ lies at a higher level than the rear locking braking force $F_{B,HA}$, that is to say $F_{B,VA} > F_{B,HA}$, which is the case owing to the dynamic wheel load distribution that arises during the braking operation. The difference between the front locking braking force $F_{B,VA}$ and the rear locking braking force $F_{B,HA}$ is specified as a differential locking braking force $dF_B$. Here, the following applies: $dF_B \sim F_{B,VA} - F_{B,HA}$.

Thus, starting at the time $t_2$, a rear setpoint drive force $F_{A,SOLL}$ is set so as to substantially correspond, in terms of magnitude, to the occurring differential locking braking force $dF_B$, that is to say $F_{A,SOLL} \sim dF_B$.

Figure 4:
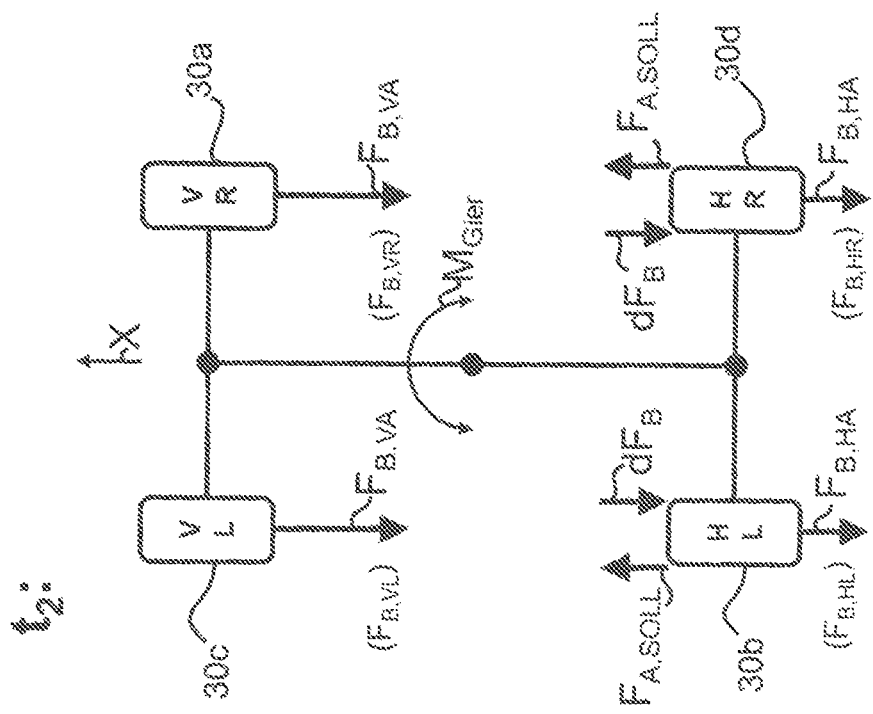
Figure 3:
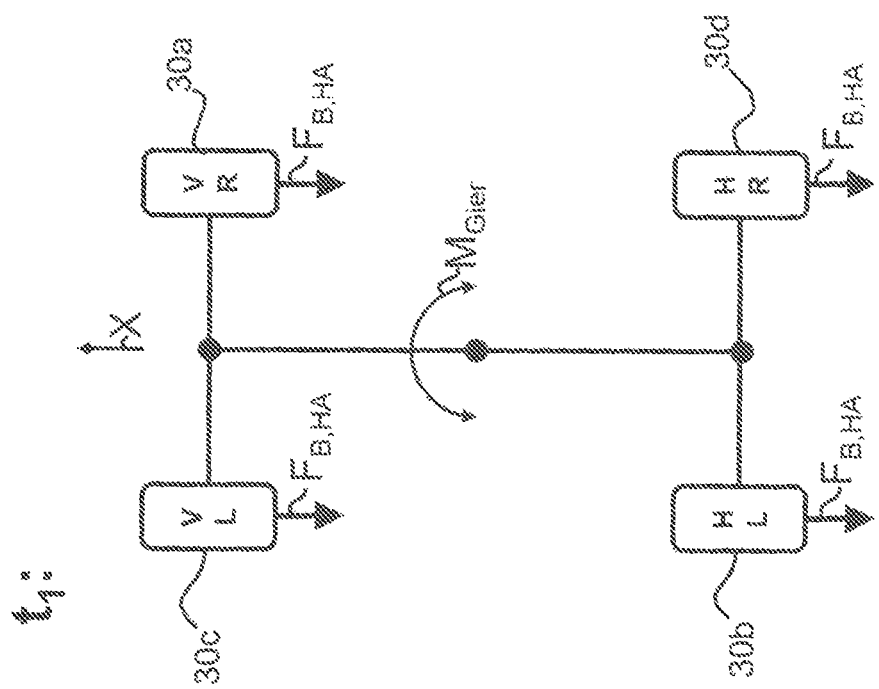

FIGS. 3 and 4 schematically show a motor vehicle travelling in a direction X, during a braking operation. The illustration here shows the balances of forces that respectively result, during the braking operation illustrated in FIG. 2, at the wheels 30a, 30c of the front axle and at the wheels 30b, 30d of the rear axle at the times $t_1$ and $t_2$.

By virtue of the rear wheels 30b, 30d being driven by the electric drive 11, a braking force $F_{B,VA}$ can act at the front wheels 30a, 30c at the time $t_2$, which braking force is greater than the braking force $F_{B,HA}$ that acts at the front wheels 30a, 30c at the time $t_1$, that is to say $F_{B,VA} > F_{B,HA}$. The braking distance of the motor vehicle is consequently shortened.

Furthermore, here, between the times $t_1$ and $t_2$, the occurring differential braking force $dF_B$ is compensated by the setpoint drive force $F_{A,SOLL}$ at the rear wheels 30b, 30d.

In FIGS. 3 and 4, it is assumed that braking forces that substantially correspond in terms of magnitude act in each case at the left-hand wheel 30b, 30c and the right-hand wheel 30a, 30d of a vehicle axle, that is to say $F_{B,VL} \sim F_{B,VR}$ and $F_{B,HL} \sim F_{B,HR}$. This situation is for example the case during a braking operation on a roadway with a homogeneous friction coefficient.

In this context, it should be noted that the dynamic wheel load distribution that arises during the braking operation allows a greater differential braking force $dF_B$ in the case of a high roadway friction coefficient, for example in the case of a dry roadway, than in the case of a low roadway friction coefficient, for example in the case of a slippery roadway.

This is a distinguishing feature inter glia of the method according to the disclosure, specifically that the differential braking force $dF_B$ can be compensated in a situation-dependent manner, for example in a manner dependent on the roadway friction coefficient that is relevant for the braking operation, by virtue of a setpoint drive force $F_{A,SOLL}$ being set at the rear wheels 30b, 30d.

Owing to 1-channel pressure generation by the pressure-generating unit 14, although wheel-specific brake force control is not possible, it is possible to implement axle-specific brake force control owing to a setpoint drive force $F_{A,SOLL}$ being settable at the wheels 30b, 30d of the rear axle.

In this way, it is possible on an axle-specific basis to implement so-called "select-low" control or so-called "select-high" control, which is generally implemented in the case of a braking operation on a roadway with inhomogeneous friction coefficients.

In the case of "select-low" control, what is of crucial importance is the wheel 30a to 30d which locks first, that is to say which, depending on the axle, reaches a rear locking braking force $F_{B,HA}$ or a front locking braking force $F_{B,VA}$ first. Here, it is accepted that that wheel 30a to 30d which is situated on a high roadway friction coefficient is under-braked, as a result of which the braking distance is increased for the benefit of vehicle stability.

In the case of "select-high" control, what is of crucial importance is the wheel 30a to 30d which locks second, that is to say which, depending on the axle, reaches a rear locking braking force $F_{B,HA}$ or a front locking braking force $F_{B,VA}$ second. Here, it is accepted that that wheel 30a to 30d which is situated on a low roadway friction coefficient is over-braked, as a result of which the braking distance is reduced for the benefit of vehicle stability.

There is the option here for one axle of the motor vehicle to be controlled in accordance with the "select-low" principle and for the other axle of the motor vehicle to be controlled in accordance with the "select-high" principle. In this way, it is advantageously possible, for the benefit of vehicle stability, for the yaw moment $M_{Gier}$ of the motor vehicle to be reduced, or compensated.

In this way, in the case of a failed slip control system 40, the driving stability of the motor vehicle can be improved.

In one exemplary arrangement, vehicle stability can be ensured even in the case of critical vehicle loading on changing underlying surfaces.

Furthermore, in this way, in the case of a failed slip control system 40, the motor vehicle can be reliably braked, even on underlying surfaces with low or varying friction coefficients.

Furthermore, in this way, by the pressure-generating unit 14 that is coupled in 1-channel configuration to the brake actuators 28a to 28d, the motor vehicle can be very intensely decelerated.

In this way, the pressure-generating unit 14 that is coupled in 1-channel configuration to the brake actuators 28a to 28d forms a reliable fall-back level in the event of a failure of the slip control system 40.

The disclosure is not restricted to the exemplary arrangement shown. For example, individual features of an exemplary arrangement may be combined in any desired manner with features of other exemplary arrangement, independently of the other features of the corresponding exemplary arrangements.

The invention claimed is:

1. A method for operating a brake system for a motor vehicle having at least one electric drive, the motor vehicle having a left-hand front wheel, having a right-hand front wheel, having a left-hand rear wheel and having a right-hand rear wheel, wherein the brake system has a brake device with a hydraulic pressure-generating unit and with a control unit, has a slip control system, and has four brake actuators which are connected in 1-channel configuration to the pressure-generating unit and which are assigned to a respective one of the wheels of the motor vehicle, wherein, in an event of a failure of a slip control system, in order to substitute the failed slip control system, the method comprising the following steps:
   a) applying a pressure to the four brake actuators by the pressure-generating unit, and
   b) driving the rear wheels by the electric drive.

2. The method according to claim 1, wherein, in step a), the pressure is controlled on the basis of the slip of at least one of the front wheels, wherein the slip of the at least one front wheel is ascertained by a wheel sensor that is assigned to a corresponding front wheel.

3. The method according to claim 2, wherein, in step a), the pressure at least temporarily has a value that leads to locking of a single one of the wheels of the front wheels.

4. The method according to claim 2, wherein, in step b), the rear wheels are driven in a manner controlled on the basis of the slip of at least one of the rear wheels, wherein the slip of the at least one rear wheel is ascertained by a wheel sensor that is assigned to the corresponding rear wheel.

5. The method according to claim 4, wherein the method is provided in a motor vehicle with an autonomous driving mode.

6. The method according to claim 4, wherein the brake system comprises an electronic brake booster and/or a brake-by-wire brake system.

7. The method according to claim 1, wherein, in step b), the rear wheels are driven in a manner controlled on the basis of the slip of at least one of the rear wheels, wherein the slip of the at least one rear wheel is ascertained by a wheel sensor that is assigned to the corresponding rear wheel.

8. The method according to claim 7, wherein, in step b), the rear wheels are driven such that at least one of the rear wheels runs with a degree of slip of less than 10%.

9. The method according to claim 7, wherein, in step b), the rear wheels are driven such that at least one of the rear wheels runs with a degree of slip of less than 3%.

10. The method according to claim 1, wherein the method is provided in a motor vehicle with an autonomous driving mode.

11. The method according to claim 1, wherein the brake system comprises an electronic brake booster and/or a brake-by-wire brake system.

12. A control unit for a brake system, wherein said control unit is configured to carry out a method according to claim 1.

13. A ontrol unit according to claim 12, wherein the control unit is connected, for transmission of signals, to four wheel sensors that are assigned to a respective one of the wheels of the motor vehicle.

14. A brake system having a control unit according to claim 12.

* * * * *